(12) United States Patent
Shah et al.

(10) Patent No.: US 8,473,367 B2
(45) Date of Patent: Jun. 25, 2013

(54) COMPUTER BASED MEDIA ACCESS METHOD AND SYSTEM

(76) Inventors: Rahul U. Shah, Chelmsford, MA (US); Neil A. Cholli, Chelmsford, MA (US)

( * ) Notice: Subject to any disclaimer, the term of this patent is extended or adjusted under 35 U.S.C. 154(b) by 248 days.

(21) Appl. No.: 12/777,534

(22) Filed: May 11, 2010

(65) Prior Publication Data

US 2010/0287071 A1    Nov. 11, 2010

Related U.S. Application Data

(60) Provisional application No. 61/177,035, filed on May 11, 2009.

(51) Int. Cl.
G06Q 30/00 (2012.01)
(52) U.S. Cl.
USPC .......................... 705/26.7; 705/26.1; 705/27.1
(58) Field of Classification Search
USPC .......................... 705/26, 27, 1, 26.1, 27.1, 26.7
See application file for complete search history.

(56) References Cited

U.S. PATENT DOCUMENTS

| | | | |
|---|---|---|---|
| 2006/0089912 A1* | 4/2006 | Spagna et al. | 705/51 |
| 2006/0212444 A1* | 9/2006 | Handman et al. | 707/5 |
| 2008/0034126 A1 | 2/2008 | Baker | |
| 2009/0157892 A1 | 6/2009 | Sekiguchi et al. | |
| 2010/0076983 A1* | 3/2010 | Gates et al. | 707/749 |

FOREIGN PATENT DOCUMENTS

| WO | WO 2008/017043 | 2/2008 |
|---|---|---|
| WO | WO 2008/096055 | 8/2008 |

* cited by examiner

*Primary Examiner* — Jeffrey A Smith
*Assistant Examiner* — Courtney Stopp
(74) *Attorney, Agent, or Firm* — Hamilton, Brook, Smith & Reynolds, P.C.

(57) ABSTRACT

The disclosed system and method includes a global computer network facility which provides a platform allowing artists to quickly and easily promote their music. A method and system of uploading songs establishes unique characteristics of each song with audio-analytical tools, and stores the analyzed songs on an online cloud computing storage facility. The artist-users can efficiently promote their music directly to the right suited audience in a fair fashion, providing a platform for all artists, including lesser known and popular artists. Simultaneously, the system allows listeners to readily access their entire music library from any mobile device via syncing music to devices with the invention's client application. At the same time, listener-users are automatically prompted with new or recommended music based on audio/acoustical characteristics of the song that they are currently listening to.

21 Claims, 11 Drawing Sheets

COMPUTER BASED MEDIA ACCESS METHOD AND SYSTEM

RELATED APPLICATION

This application claims the benefit of U.S. Provisional Application No. 61/177,035, filed on May 11, 2009, and herein incorporated by reference in its entirety.

BACKGROUND OF THE INVENTION

The music market is quickly evolving and ever-growing. New technologies, opportunities, and challenges are constantly being introduced.

There are many elements that currently employed technology do not address. For example, Pandora Radio manually analyzes its music through employees rather than in an automated fashion. See www.computer.howstuffworks.com/internet/basics/pandora.htm, and www.blogs.sun.com/plamere/entry/genius or savant syndrome. Such manual processing institute a potentially biased view of the characteristics of songs. Also, Pandora Radio is incapable of music back up and streaming music for listeners. Similar to Pandora Radio, Last.fm lacks the capabilities of syncing and music file back-up.

Moreover, though Apple® iTunes' "Genius Bar" promotes the works of artists to listeners, it is not done fairly. Firstly, the analysis of matching artists to listeners is incompetent since it solely relies on simple, incomprehensive data, including genre, album, track title, and artist name, which do not encompass the entire scope of various characteristics of songs. In addition, extremely well-known artists are more predominantly advertised rather than those who are simply a better match. Apple's iTunes also prohibits listeners from syncing music to any mobile device other than Apple's products.

Another insufficient technology, Sugar Sync lacks music intelligence and a platform of artists. Thus, Sugar Sync is incapable of giving listener-users recommendations for new songs and prohibits them from expanding their musical taste. In no way does Sugar Sync introduce the concept of uniting music listeners with artists.

Emerging music artists face multiple obstacles in their attempts to promote their works. Customers have primarily shifted towards using mobile devices to listen to music, and therefore the advertising and retail market for the artist may have a defined channel of commerce for promoting their works. However, this platform-base is overly competitive, and the most popular artists are primarily listened to on these various devices, giving less exposure to novel artists.

The current mobile device technology presents other problems and limitations to the listener such as logistics in storing music libraries and inflexibility among mobile devices to use at any given moment.

SUMMARY OF THE INVENTION

The present invention address the foregoing problems of the prior art. The instant invention seeks to harness new technology, utilize new opportunities, and simultaneously solve the new challenges at hand. In turn, the proposed invention targets the mobile music market.

In particular, the instant invention provides the facility which uniquely brings together music-artists and music-listeners. For artists, the novel invention gives a platform that promotes their music to the right audience, or listeners who appreciate similar types of music. For listeners, the invention provides a centralized place to store their music library so that it can be accessed and listened to from anywhere with the capability of being "backed-up," or being able to be retrieved if their computer loses their songs. The invention method and system utilizes audio analysis tools that evaluates characteristics of the artists and listeners' songs and cross-checks them. Then, the invention instantly shows a best-matched artist's song (strictly and fairly judged by having the most similar acoustic-type traits, not popularity) that fit that listener's taste in music. This showing is made through the respective listener's mobile devices enabling playback of the matched artist song.

Thus, the present invention advantageously gives equal opportunity for both lesser known and popular artists; it is based upon the artist song's audio characteristics with respect to the listener song's specific audio characteristics. As a further advantage, the instant invention also provides flexibility for listeners to listen to their music libraries on any mobile device without storing these songs on the hard-drive space of their devices. This is made possible with the streaming and syncing of their music through an online cloud storage facility.

In a preferred embodiment, a method and system of media access includes:

using cloud computing storage, holding artist songs on behalf of respective artist users and holding listener songs on behalf of respective listener users, said holding including for each artist song and each listener song, having respective results of an audio analysis; and enabling a listener user using a mobile device to access respective listener songs held by the cloud computing storage, including in response to a listener user request for a certain listener song, comparing audio analysis results of the certain listener song to audio analysis results of artist songs held in the cloud computing storage. If the comparing results in a match to one or more artist songs then the method displays through the mobile device indications of the one or more matching artist songs. In response to the listener user request for the certain listener song, the method streams the certain listener song to the mobile device from the cloud computing storage.

In some embodiments, the audio analysis is automatically applied on upload of an artist song to the storage member (cloud computing storage). Similarly, the audio analysis may be automatically applied on upload of listener songs to the storage member. The audio analysis includes determining any of song beat rate, vocal pitch, tempo, rhythm and other musical or acoustic characteristics.

Some embodiments further comprise a website configured to provide to listener users and artist users access to the storage member. The website may automatically apply the audio analysis to each artist song and listener song upon upload of the song to the storage member.

In one embodiment, a mobile device interface displays through the mobile device the indications of matching artist songs during streaming of the certain listener user song to the mobile device. The mobile device interface enables the listener user to select and play at least one of the matched artist songs on the mobile device, the storage member streaming the at least one matched artist song to the mobile device.

The mobile device interface may further enable the listener user to access additional goods by the respective artist user of the at least one matched artist song.

The mobile device interface further enables the listener user to purchase a copy of the at least one matched artist songs.

The mobile device is any of a mobile phone, smart phone, personal data assistant, portable computer, portable media player, or combinations thereof.

The cloud computing storage member enables the mobile device to be free of storing songs locally and thus relieves memory space on the mobile device.

A BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

Figure 2:
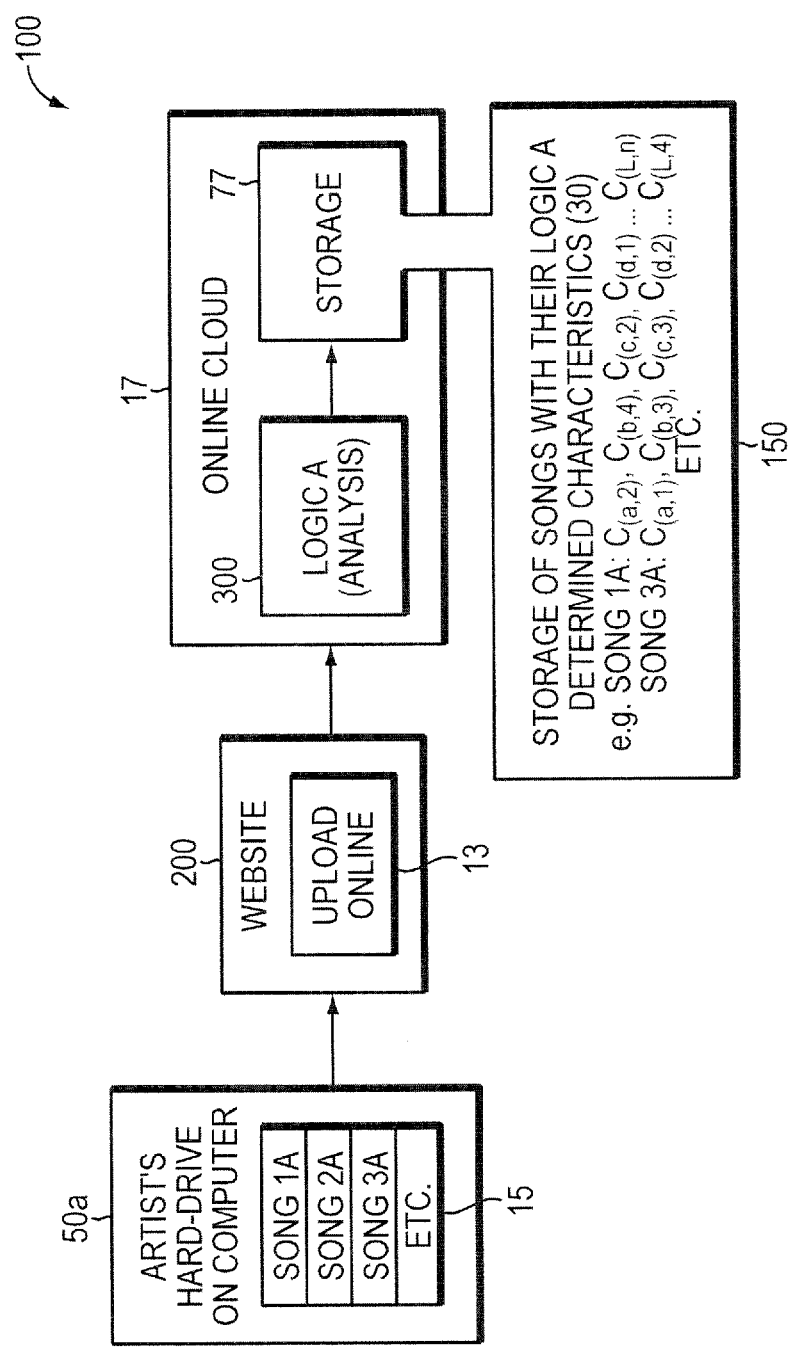
FIG. 2 is a flow diagram of the invention uploading artists songs online, where they will be analyzed for characteristics and stored on the online cloud storage member.
Figure 3:
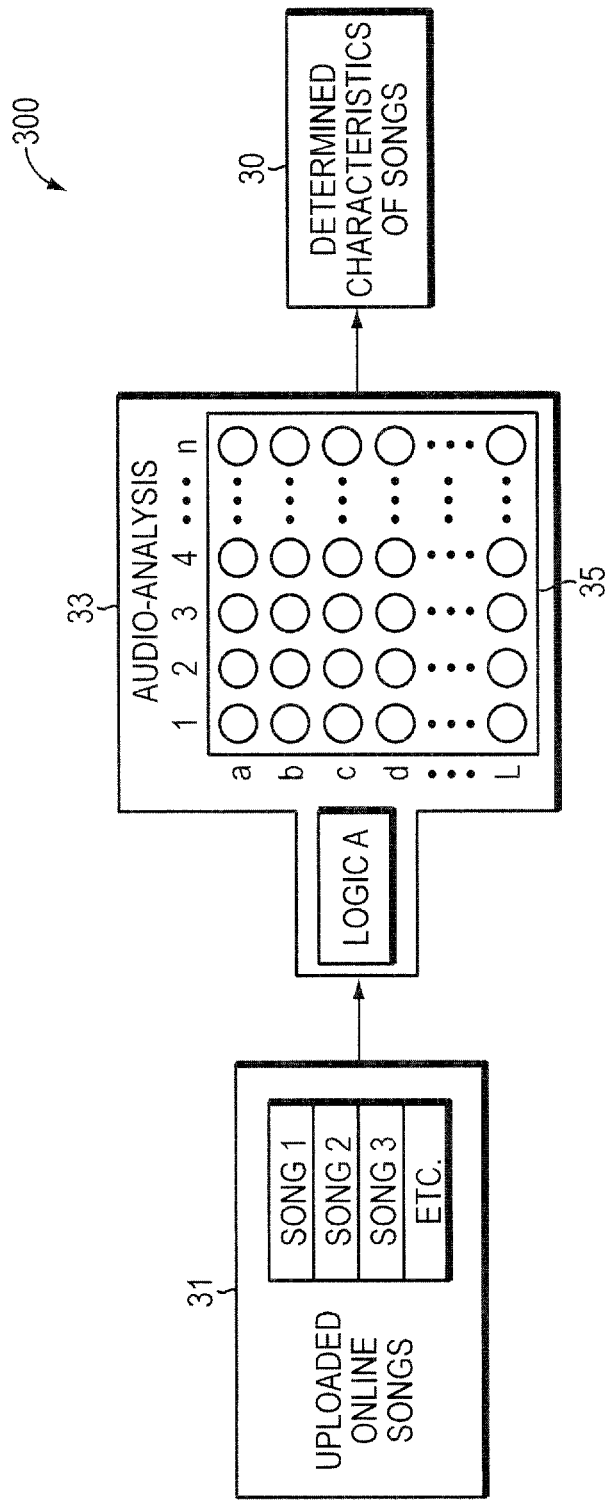
Figure 6:
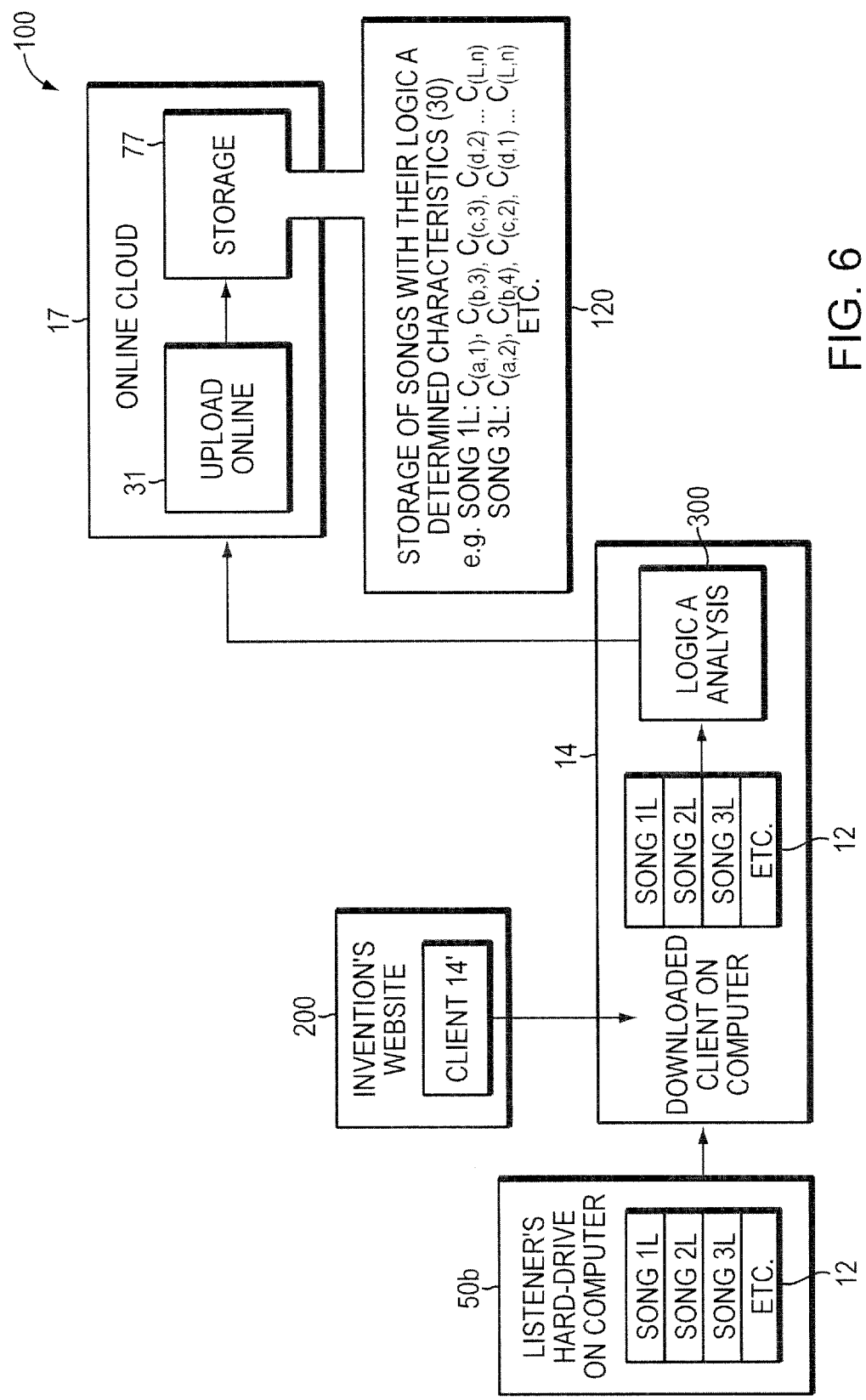

FIG. 3 is a block diagram of the invention audio-analysis tool/process that characterizes songs as uploaded by artists in FIG. 2 and listeners in FIG. 6. The song characterization process logic (Logic A) is pictorially represented with a matrix and several varying characteristics defined by 1-n (columns) and a-L (rows), the possible cells (circles), which are filled according to the song's specific traits.

Figure 4:
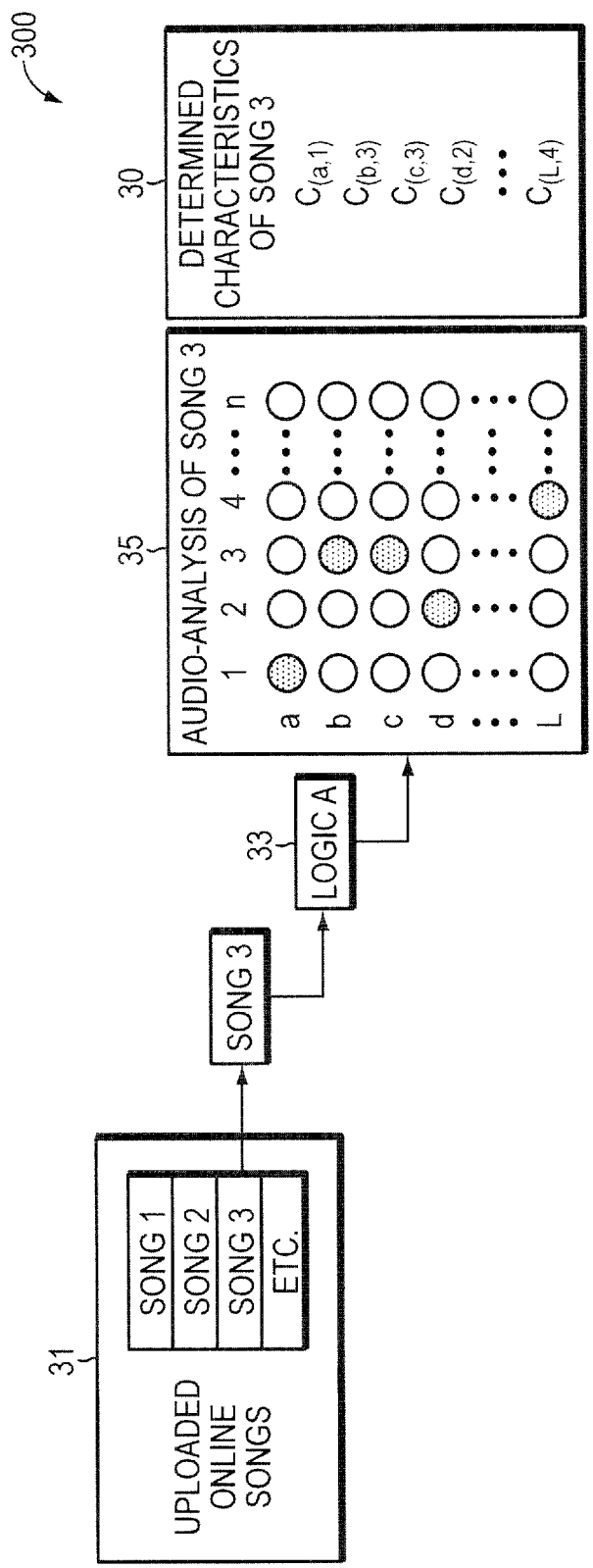

FIG. 4 is a schematic view of a specific example of a song analysis (for a Song 3) as depicted in FIG. 3; specific characteristics detected by Logic A are represented by filled circles.

Figure 5:
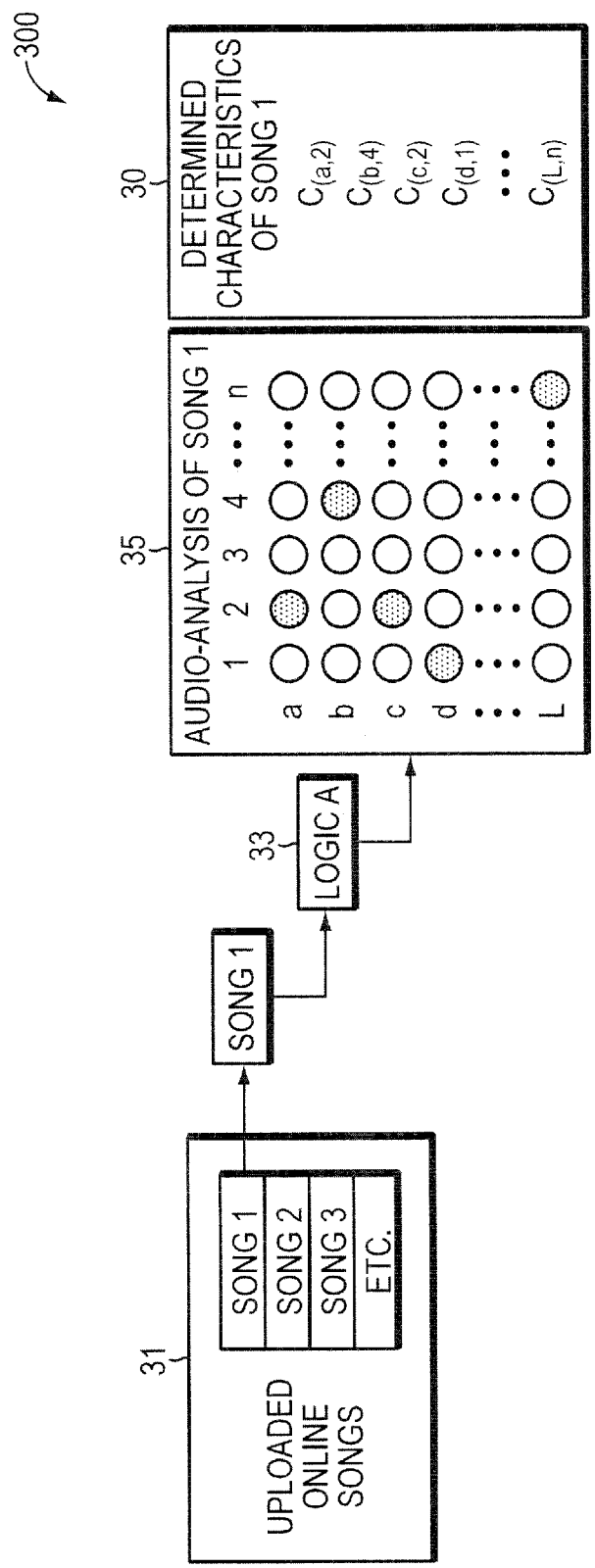

FIG. 5 is a schematic view of specific example of a song analysis (for a Song 1) as depicted in FIG. 3; specific characteristics detected by Logic A are represented by filled circles.

FIG. 6 is a flow diagram illustrating the invention listener upload process uploading a listener's songs onto the online cloud storage member with a supplied client that analyzes and syncs songs directly from the listener's computer to the online cloud.

Figure 7:
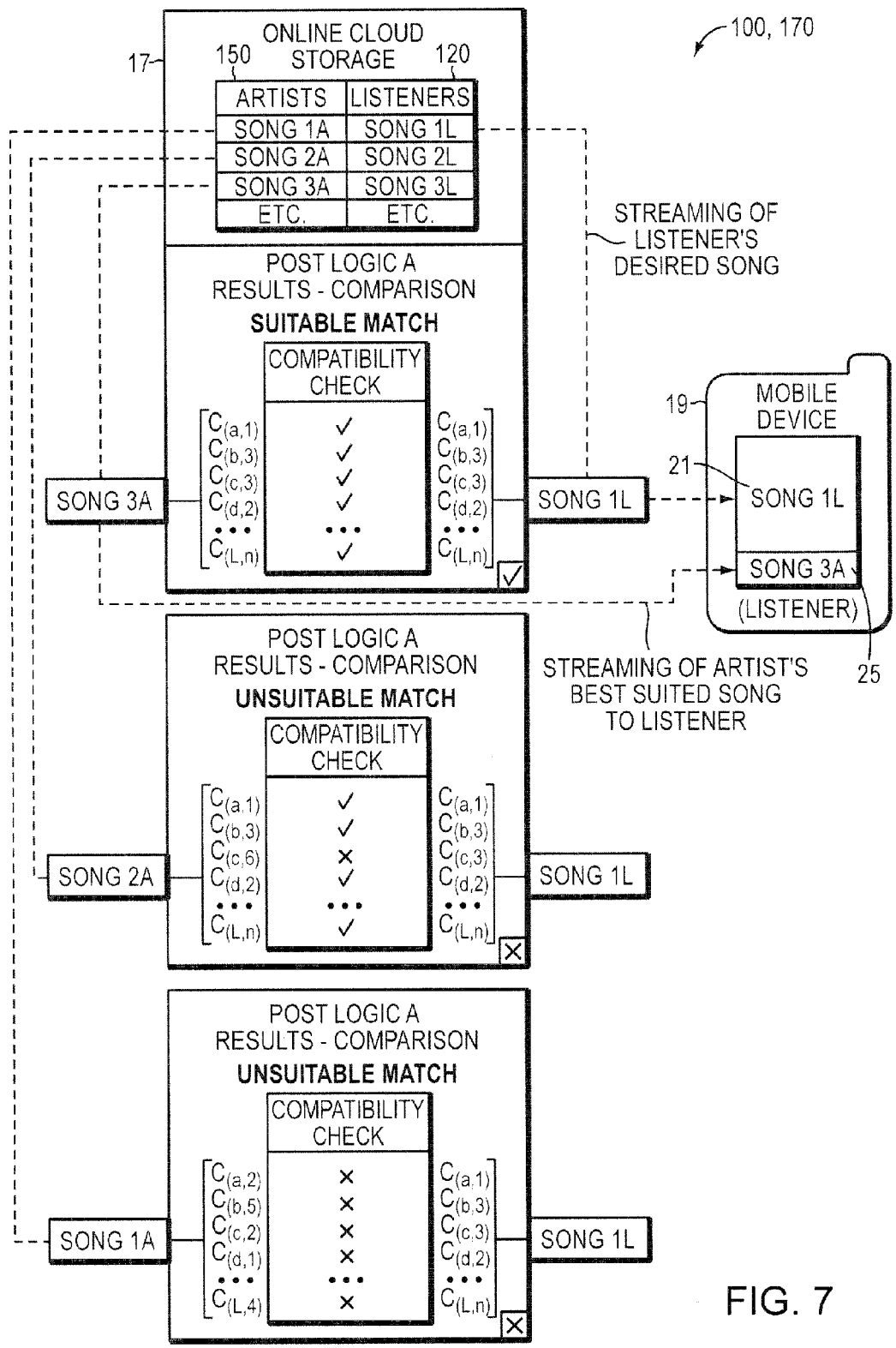

FIG. 7 is a flow diagram portraying that when the listener wishes to listen (through his mobile devices) to a certain song as stored on the online cloud storage, the pre-analyzed characteristics of that particular song (from FIG. 6) is cross-checked with the detected characteristics of artists' songs (from FIG. 2) allowing the best-matched artist song(s) to be prompted to that listener.

Figure 8:
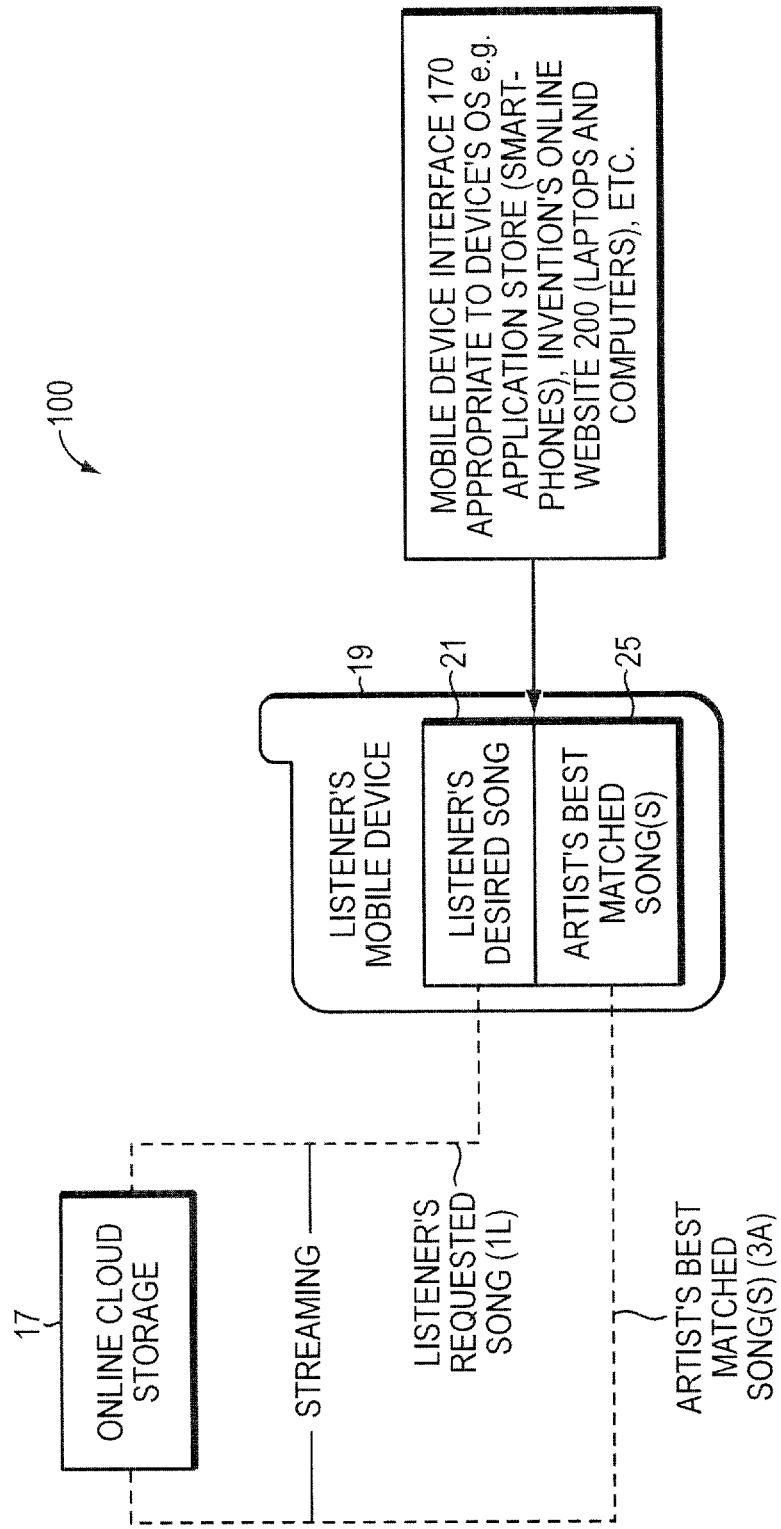

FIG. 8 is a schematic view of the results of the process of FIG. 7 downloaded to the requesting listener's mobile device and representing the streaming of the listener's desired (requested certain) song and the best-matching artist's song.

Figure 9:
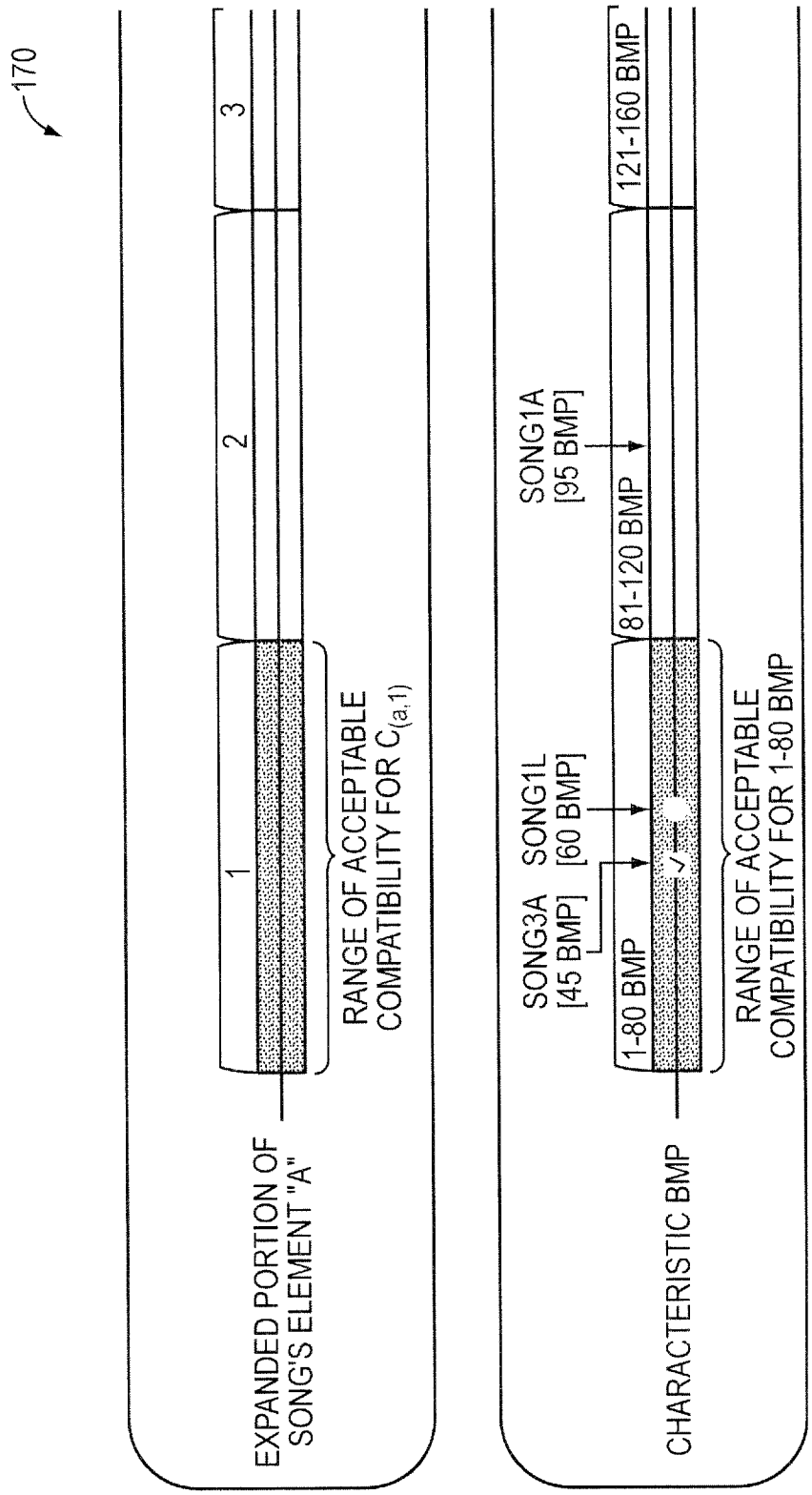

FIG. 9 is a detailed schematic view illustrating the invention comparator analysis determining whether an artist's song matches the listener's song by detected characteristics falling within given (predefined) boundaries or ranges of each of the listener song's determined characteristics.

Figure 10A:
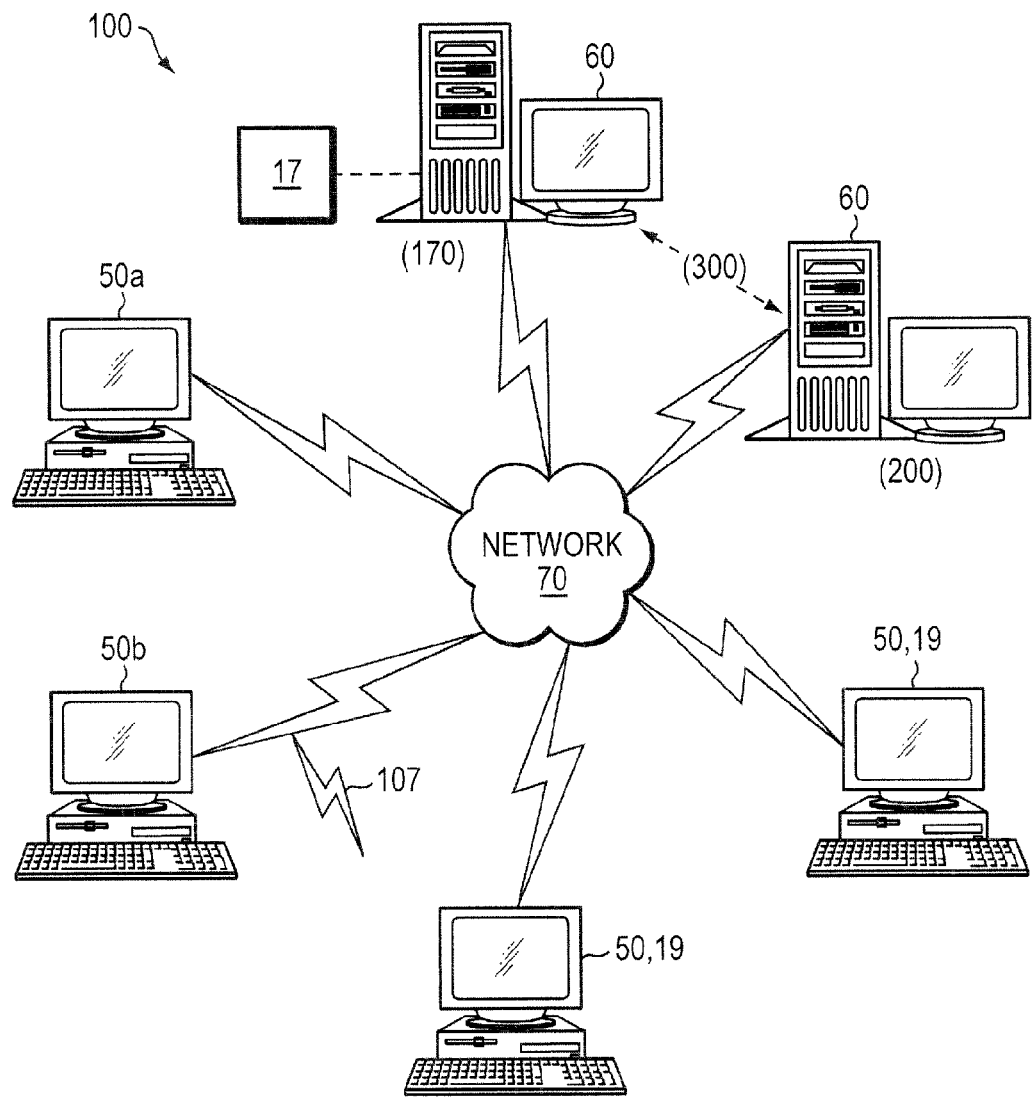
Figure 10B:
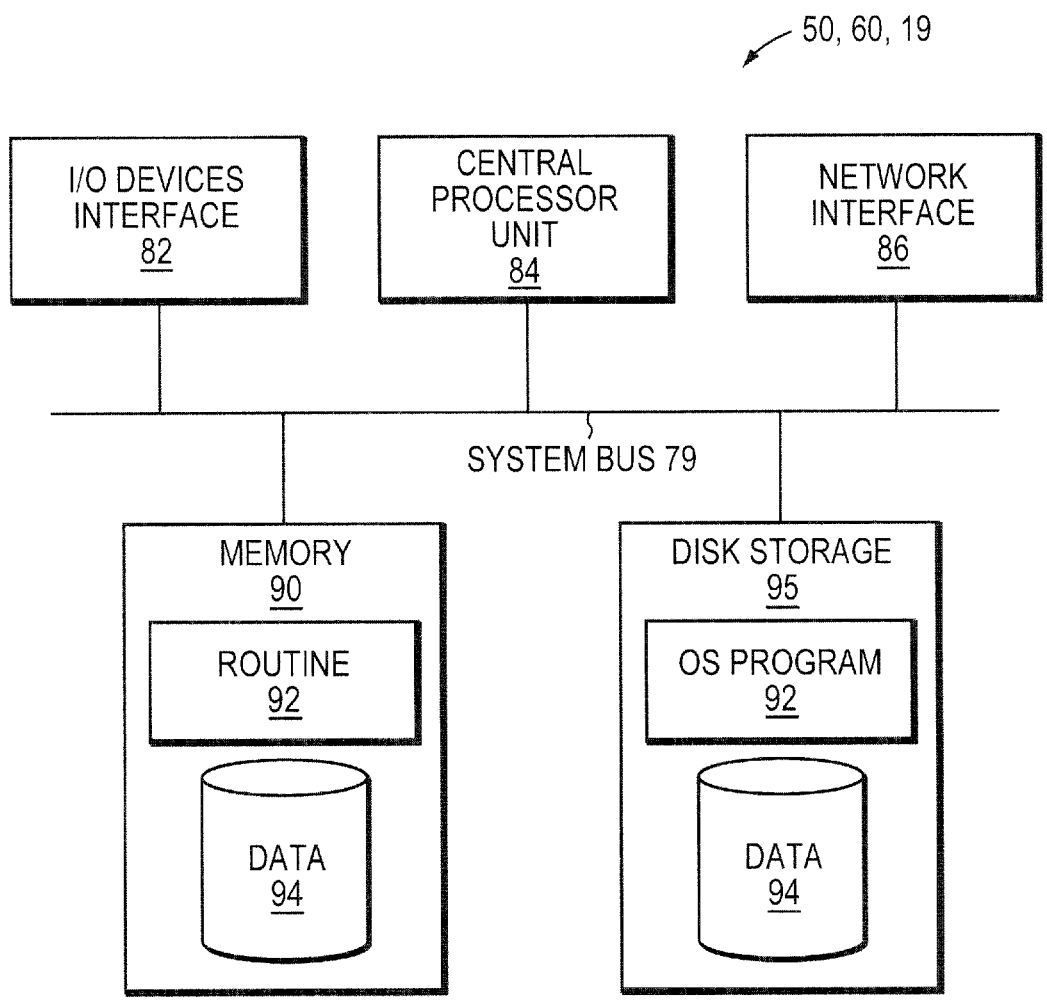

FIGS. 10A and 10B are schematic and block diagrams respectively of a computer/device network environment in which embodiments of the present invention are deployed.

DETAILED DESCRIPTION OF THE INVENTION

The present invention facilitates key capabilities for music artists and music listeners. As presented in one of the preferred embodiments (system 100) shown in FIG. 1, at 13, the artist uploads his created music (songs) 15 online where it is analyzed and stored in an online cloud storage facility 17. Online cloud computing supports cloud storage facility 17. Similarly, a mobile music listener can upload and store his music (songs) 12 on the online cloud storage facility 17 using a downloaded client 14. Listeners can retrieve and play a desired song(s) by streaming it onto a mobile device 19 (including mobile phones, smart-phones, laptops, PDA's (personal Data Assistants), portable digital music players and any other device with internet access) with the proposed invention's application installed on it. As the listener listens to his desired (requested) song on device 19, the music from the artists as stored on the cloud storage facility 17 is cross-checked. Artists' songs 25 that are most similar (e.g., in acoustical or musical characteristic traits) to the requested song 21 that the listener is listening to are presented to the listener.

A core aspect of this invention is its use to music artists. According to some embodiments of the present invention, it focuses particularly novel artists—artists that are emerging and struggling to compete with well-known artists. Artists are given an opportunity to utilize the listener users to selectively show their songs to those that will appreciate the music they make. By simply uploading artists songs 15 to the online cloud 17, the invention delivers such songs/music to the right (best suited/matching) listeners through the use of music-analysis tools 300. This is where the present invention's (system's 100) platform for promoting music distinctly differentiates from the rest; the artist's music is directly presented to the right listeners when the listeners are listening to songs 21 that characteristically match with the created music by emerging artist(s). In another aspect, the present invention does not promote well-known artists more than unknown (or lesser known) artists thereby providing equal opportunity to lesser known artists to compete in the crowded music industry. When the "best matching" songs 25 (as determined by invention system 100) are presented to the listener users, the listener users are given the opportunity to give feedback or to purchase the artist's music, concert tickets, merchandise, or obtain additional information about the artist instantly.

Figure 1:
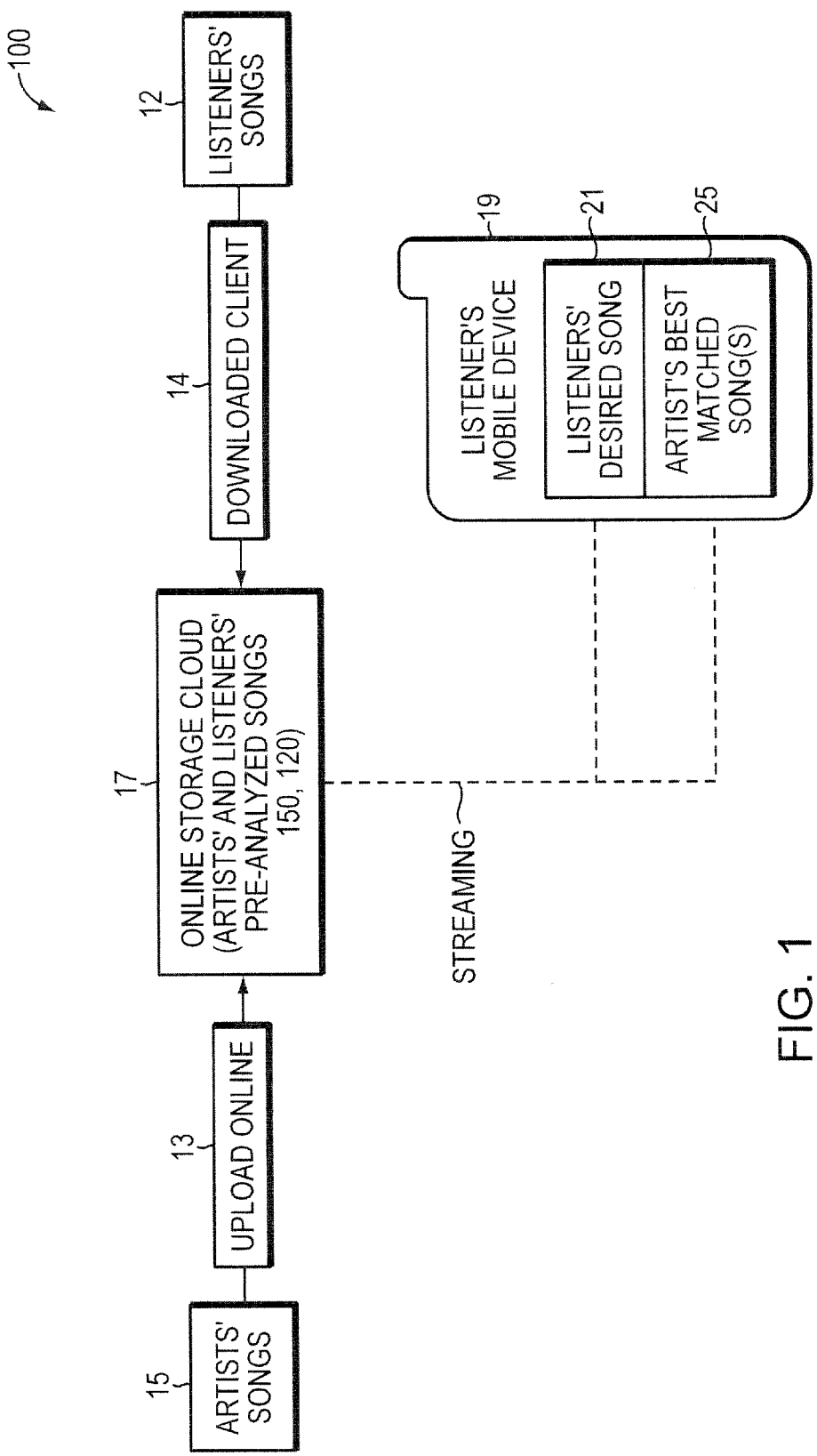
FIG. 1 is schematic overview of embodiments of the invention: providing listeners access to their music via mobile device and giving a platform for artists by prompting their songs with similarly matched listeners' songs.

Turning now to FIG. 2, illustrated is system 100's mechanism enabling artists to upload their created songs 15 online using the instant invention's platform, which is broadly displayed in FIG. 1. Initially, an artist's songs 15 (labeled in FIG. 2 by symbols "1A", "2A", . . . etc., with "1", "2", . . . etc. standing for the $1^{st}$ song, $2^{nd}$ song, . . . etc., and "A" for Artist) are stored on the artist's hard-drive on his computer 50A for example. From here, the artist can use the preferred embodiment's website 200 to upload songs 15. From the website 200, each of the songs in the online upload 13 is transferred to the online cloud storage facility 17 where the invention Logic A (the audio analysis process 300 which analyzes and derives characteristics of uploaded songs) is preformed. For example, Song 1A is analyzed as having the unique characteristics (generally referenced 30) of $C_{(a,2)}$, $C_{(b,4)}$, $C_{(c,2)}$, $C_{(d,1)}$ . . . $C_{(L,n)}$ as illustrated at 150 in FIG. 2. After being assigned characteristics 30 by audio analysis 300, the artist's songs together with indications 150 of the determined characteristics 30 are stored, in the cloud storage 77 and later presented to listener users who are listening to similarly characterized or matching characteristic songs 21.

In another aspect of the invention, FIG. 3 details Logic A (i.e., the process of audio analysis 300 of FIG. 2.). It is this process that analyzes and derives determined characteristics 30 of songs 12, 15 uploaded respectively by the artist users and listener users (as will become clear below). This process/audio analysis 300 automatically occurs in the preferred embodiment of the present invention when the artist initially uploads a song 15 to the instant invention's website 200. In response to the uploaded songs (31 generally), process 300 (at step 33) breaks down, each song individually to working characteristics including but not limited to the song's beats per minute (BPM), vocal pitch and recognition, style of lyrics, melody, composition, rhythm, tempo, and harmony. Various working characteristics, especially music based or audio based characteristics are suitable. Each working characteristic is represented in FIG. 3 by a respective lettered row a, b, c, d, . . . L in the Logic A (step 33).

Logic A/song characterization step 33 allots each working characteristic a value (illustrated by the numbered columns, 1, 2 3, 4, . . . n in FIG. 3). For non-limiting example, for song beats per minute, the values may be assigned as follows:

1 for 1 to 80 BPM,
2 for 81 to 90 BPM,
3 for 91 to 100 BPM, . . . and
n for over 200 BPM.

For vocal pitch, the values may be assigned as follows:
1 for pitches below A220 (the A below middle C at 220 Hz),
2 for pitches between A220 and A440,
3 for pitches between A440 and A880,
. . .
n for pitches above A1760.

And so forth for each working characteristic with respective range of values/value meanings Respective common or known audio detection techniques and technology are employed by Logic A/process step 33 for analyzing each working characteristic and determining respective value to assign. The lettered rows and numbered columns form a matrix 35, where each of the song's working characteristics and attributes could occupy a certain position of the matrix. For example, as presented in the non-limiting illustration of FIG. 4, for working characteristic "a" (which could stand for BPM) of Song 3, the invention Logic A/process step 33 assigns a value of "1" (which could stand for a beat rate between 1 and 80 beats per minute). In a similar way, the other attributes (working characteristics and corresponding values) for Song 3 are shown with highlighted circles in the matrix 35 of FIG. 4. The highlighted circles (or cells) of the matrix 35 form the results of the audio analysis 300. The audio analysis 300 results are thus a set of determined characteristics 30, i.e., $C_{(a,1)}, C_{(b,3)}, C_{(c,3)}, C_{(d,2)} \ldots C_{(L,4)}$ for Song 3.

Another song that an artist uploads might have different working characteristics values for these attributes. For example, the resulting determined characteristics 30 for Song 1 in FIG. 5 are shown with corresponding highlighted matrix 35 circles ($C_{(a,2)}, C_{(b,4)}, C_{(c,2)}, C_{(d,1)} \ldots C_{(L,n)}$).

Once these songs 31 are analyzed, system 100 stores each song with determined characteristics 30 in the online cloud storage facility 17 as 150. Subsequently, when a listener requests from cloud storage facility 17 one of his songs 21, system 100 (e.g., through mobile device interface 170 detailed later) crosschecks the various artists songs as analyzed and stored at 150 for similar determined characteristics 30. When a match is made, system 100 enables the listener to listen to the matching artists song 25 and provide feedback. System 100 enables the artist of the matched song 25 to receive the feedback from that particular listener if the artist prefers to receive it (for example, through website 200). In addition, as previously desired or otherwise set by the artist (for example, during the upload process through website 200), there may be a limit to the number of times that system 100/interface 170 allows the listener to listen to the song before being required to buy it. Known or common programming techniques are used to accomplish the forgoing and to sell the artist's music, concert tickets, and other merchandise through system 100.

Another main aspect of the instant invention is its use to listeners or listener users. The targeted listeners are people that use any device with internet capabilities and the application of the proposed invention installed on it. Out of this large number of listeners, the present invention primarily focuses upon people that desire music on their smart-phones (or similar mobile devices), so that they may stream their songs via internet connection through the method and system 100 of the present invention. In one embodiment, each listener-user makes/opens an account to the invention's website 200 and obtains the amount of online cloud space (storage 77 area/volume) he wishes for storing his music (songs 12). Next the listener-user downloads a client 14' (from website 200) for his computer 50*b*. In the downloaded (local) client 14, the listeners' songs 12 are analyzed for characteristics using audio-analytical tools 300 (i.e. the Logic A process of FIG. 3). This client 14 has the capability to automatically upload (to 31) all of the music from the listener-user's computer 50*b* onto his account (of storage 77) on the cloud facility 17. Alternatively, the listener-user has the option to manually upload his songs to his account/storage 77 on the online cloud storage facility 17 via the client 14.

Subsequently, the analyzed songs and their respective determined characteristics 30 (together 120) are stored onto the listener-user's online cloud facility 17 account/storage 77 account, where the songs are kept safe and backed up. By doing so, the user is permitted to retrieve his music from the online cloud facility 17 if lost on his computer hard drive 50*b* for example. From here, the listener-user can quickly stream his music to and listen to his music from any mobile device 19 equipped with internet access and the present invention's application (mobile device interface 170). As the user is listening to the song(s) that he had streamed to his mobile device 19, system 100, 170 automatically cross checks the song's pre-analyzed determined characteristics 30 (as stored at 120 in storage 77) with that of music from the artist users (as stored at 150 in storage 77). The most similarly-matched songs are instantly presented to the listener user by the system 100, 170, for example in one embodiment system 100, 170 displays indications of these songs in the screen view of the listener's mobile device 19.

The embodiment in FIG. 6 exhibits the process of how listeners upload their songs online. First, the listener's songs 12 (represented in FIG. 6 by symbols 1L, . . . 2L for Songs 1, 2, . . . ) are stored on the listener's computer 50B. The listener can transfer these songs 12 onto the downloaded client 14. Here, the songs 12 undergo the Logic A process 300 which analyzes each song's characteristics. The client application 14 is able to automatically sync these songs 12 with their determined characteristics 30 to the listener-user's account/storage 77 on the online cloud storage facility 17, where they (songs plus determined characteristics) 120 are stored and the songs are ready to be streamed to the listener's mobile devices 19. The songs are only stored on the cloud facility 17 and therefore save the listener hard-drive space on their mobile device 19. System 100, 170 displays indications of the songs 120 that are stored on the cloud facility 17 such as in a list to the listener (showing also any potential playlists he may have constructed). When a song is chosen from the list by the listener user, system 100, 170 seamlessly streams the user selected song to the user's mobile device 19. Once the listener wishes to stop listening to the particular song, system 100, 170 is responsive to user command and removes the song from the hard-drive of the mobile device 19.

Common or known technologies are employed by system 100, 170 to locally display playlists or indications of stored listener songs, to respond to user selection (request/retrieve command) of a listed song, to stream and play a subject song 21, and to stop streaming/play of the song 21 on user command, as well as to remove the local copy of song 21 from mobile device 19 hard drive in a manner freeing memory space there.

The comparative "link" or matching process (generally, mobile device interface) 170 between songs from artists and listeners is exemplified in FIG. 7. The analyzed artist songs 150 and listener songs 120 resulting from audio analysis 300 are stored on the online cloud storage facility 17. When a listener chooses (requests) to listen to a particular song(s) of songs 120, system 100, 170 cross checks the particular listener requested song's 21 determined characteristics 30 with the various artist songs' 150 determined characteristics 30. For artist songs 150 which do not have a sufficient amount (e.g., a high percentage) of determined characteristics 30 matching that of the listener's requested particular song 21, the preferred embodiment 170 omits these songs 150 from the recommendation and does not present them to that listener. In one embodiment, it is required that substantially all of the determined characteristics 30 of the artist's song 150 acceptably match that of the listener's particular (requested) song 21 for that artist's song 150 to be presented to the listener. Other thresholds of matching number of determined characteristics 30 are suitable.

As illustrated in FIG. 7, the listener chooses to listen to Song 1L, which audio analysis 300 had analyzed (e.g., previously such as on upload in FIG. 6) as having determined characteristics $C_{(a,1)} C_{(b,3)} C_{(c,3)} C_{(d,2)} \ldots C_{(L,n)}$, for example. System 100, 170 cross-checks the determined characteristics 30 of Song 1L with all of the artists' songs 150 and their determined characteristics 30. For illustrative purposes, three artists songs, Song 1A, Song 2A, and Song 3A, are shown with their respective determined characteristics 30 in FIG. 7. In the case of Song 1A, none of its determined characteristics 30 i.e., $C_{(a,2)}, C_{(b,5)}, C_{(c,2)}, C_{(d,1)} \ldots C_{(L,4)}$ match with that 30 of the listener's Song 1L. Moreover, Song 2A has all but one matching determined characteristic 30 element c (i.e., $C_{(c,6)}$) of $C_{(a,1)}, C_{(b,3)}, C_{(c,6)}, C_{(d,2)}, \ldots C_{(L,n)}$ Contrastingly, Song 3A has all of the matching characteristics 30 as Song 1L; therefore, system 100, 170 presents only this artist's song for display on the listener's mobile device 19 for example. The listener's mobile device 19 is shown with the matched artist song 25 (Song 3A) in the screen view illustrated in FIGS. 7 and 8 along with streamed, initially requested listener song 21 (Song 1L).

In the preferred embodiment, the "best-matched" song(s) 25 are determined by the similarities between individual characteristics (musical or audio based as explained previously). A sufficient amount (e.g., all to less than all) of the characteristics 30 between the artist's song 150 and subject listener's song 21 must be the same in order for an artist's song to be considered a "best match" for presentation/display to the listener. As shown in FIG. 9, there are boundaries for each characteristic. The top expanded portion of FIG. 9 examines the matrix 35 first row, the song's characteristic element "a". This expanded portion is segmented into several sections labeled by the numbers 1, 2, 3, etc., forming characteristic values $C_{(a,1)}$, $C_{(a,2)}$, $C_{(a,3)}$, etc. for element "a". For each characteristic value, there can be a set specified range or boundaries. For instance, as shown in the lower portion of FIG. 9, the song's characteristic element "a" may stand for beats per minute (BPM). This BPM is characterized by values $C_{(a,1)}, C_{(a,2)}, C_{(a,3)}$, etc. So the illustrated characteristic value sections could represent the ranges 1-80 BPM, 81-120 BPM, 121-160 BPM, etc., respectively. Next, the subject listener song's pre-analyzed characteristic for BPM is now placed within (compared to) this expanded portion. For example, in a generic embodiment, system 100 determines that the BPM characteristic of Song 1L is 60 BPM. In order to be acceptable as a characteristic value, $C_{(a,1)}$, the listener's song determined BPM should fall within the range 1-80 BPM. Any determined BPM>80 are considered to be outside of (not within) the acceptable characteristic range for $C_{(a,1)}$. The Song 1L has 60 BPM and falls within the range of $C_{(a,1)}$ (i.e., is in the range of 1-80 BPM).

In embodiments, when comparator 170 cross-checks the listener's Song 1L against an artist's song, each of the determined characteristics 30 must match in characteristic value section (same range), as opposed to matching in absolute value, in order for system 100, 170 to recommend the artist's song to the listener. In continuation of the FIG. 9 example, the beats per minute of the artists' songs have to have characteristic value $C_{(a,1)}$ in order to be a candidate match to subject listener Song 1L and thus be in the 1-80 beats per minute range. In FIG. 9 artist's Song 3A has 45 BPM, which falls within the acceptable range of $C_{(a,1)}$ and thus is considered to be a match with this characteristic of the listener's Song 1L. With a similar analysis, artist's Song 1A has 95 BPM, which falls beyond the acceptable range for characteristic $C_{(a,1)}$. Therefore, Song 1A will not be recommended/presented to the listener by system 100/comparator 170.

In another embodiment, the boundaries for $C_{(a,1)}$ may be set to a different range. Similarly, each of the characteristic elements, a, b, c, d, . . . L (FIG. 3), may have a respective set of different ranges and boundaries. If all (or a threshold number of) characteristics a, b, c, d, . . . L values within respective ranges match between the listener's subject song 21 and the artist's song(s) 25 (i.e. are within respective given sets of boundaries/ranges), comparator/mobile device interface 170 presents the artist's song(s) 25 to the listener.

In one embodiment, if there is an artist song with absolute characteristics' values equivalent to the listener song's absolute characteristics' values, then this song is omitted to prevent duplication of the listener's song 25 and to provide songs of slight difference in musical taste to the listener. Further, in an embodiment, if there is more than one artist song 25 that is within the characteristic boundaries, then system 100, 170 shows/presents the most similar songs 25, preferably the top five songs for example, to the listener.

With a system 100 (mobile device interface, comparator 170) such as this, popularity is no longer a factor with artists; the invention's system and method is a test of musical/audio similarity. This provides a fair platform for all artists, including lesser known and popular artists.

In one embodiment, when the mobile device interface 170/system 100 presents matching song 25 to the listener's mobile device 19, the listener user may either listen to the matched artist song 25 instantly for free (the amount of free times he can listen to the song 25 is a settable parameter by the artist for example through website 200), or he can purchase it from the platform supplied by the invention system 100. Additionally, system 100, 170 enables the listener to buy merchandise or concert tickets by the artist, or retrieve more information by the artist and their background as posted to website 200. Lastly, system 100/website 200 enables the listener to give feedback to the artist (e.g., in the form of a thumbs-up or a thumbs-down) and delivers this information to the artist (e.g., via the artist's account on the invention website 200). Optionally, listeners' feedback could be used to rate the artists' songs through website 200 for example. Common techniques are used to implement the foregoing aspects.

FIG. 10A illustrates a computer network or similar digital processing environment in which the present invention may be implemented.

Client computer(s)/devices 50 and server computer(s) 60 provide processing, storage, and input/output devices executing application programs and the like. Client computers/devices 50 include artist-users computers 50A, listener users computers 50B and mobile devices 19. Server computers 60 include online cloud computing storage facility 17, website 200 server, and comparator/mobile device interface member 170, for example. Client computer(s)/devices 50, 19 can also be linked through communications network 70 to other computing devices, including other client devices/processes 50, 19 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

FIG. 10B is a diagram of the internal structure of a computer (e.g., client processor/device 50, 19 or server computers 60) in the computer system of FIG. 10A. Each computer 50, 19, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 19, 50, 60. Network interface 86 allows the computer to connect to various other devices attached to a network (e.g., network 70 of FIG. 10A). Memory 90 provides volatile storage for computer software instructions 92 and data 94 used to implement an embodiment of the present invention (e.g., Client 14, audio analyzer 300, website 200, comparator/mobile device interface 170, online cloud storage facility 17 and supporting code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Major Benefits of the Invention

The present method and system 100 permits music listener-users to use several capabilities and features.

One of these capabilities for listener-users is to be able to access their music library from anywhere, at anytime. Any listener-user, who is also a smart-phone or iPod Touch user, has the ability to listen to music from their smart-phone via the invention method's/system's 100 online cloud facility member 17.

Also, another feature of the invention is the back-up of the listener-user's entire music library. This means that in case the listener-user's music is deleted or lost, the user is able to retrieve the library from the invention cloud storage 77.

Another attribute of the invention is real time sync competence of the user's music on all his mobile devices 19. As soon as a listener-user places songs on the designated client 14, the method/system 100 can automatically place the songs on dedicated cloud computing servers, therefore allowing them to be accessed from mobile devices 19.

Yet another capability of the method/system 100 for listener-users is to reuse existing hard-drive space for music on their mobile devices 19. The music that is uploaded to the online cloud 17 is not stored on their mobile devices, but on the online cloud storage space 77. The songs 20 are kept in this cloud until the user wants to stream and listen to a certain song. When the listener user has completed listening to the subject song 21, the memory space that the song took on the user mobile device 19 is relieved (freed-up), thus conserving the device's hard-drive space and virtually 'recycling' the memory space.

Lastly, another element of the invention for listener-users is an audio-analysis tool 300 that is capable of expanding the users' musical horizons. When listener-users of the system 100 are listening to songs 21 via their mobile devices 19 with a designated application 170, the system 100, 170 scrutinizes the songs 21 for characteristics which sufficiently/effectively match that of songs from music-artist users. In conclusion, the listeners are presented with determined matching songs 25 from artist-users that suit them well but likely have not been heard.

The instant system/method 100 allows music-artist users to execute many capabilities and features.

One of these capabilities is to allow music artist-users to easily upload their music. These users don't have to be well-known or recognized; there are no barriers that these artists must face in order to upload their music to promote it to the listener-users.

In addition, the invention system 100 gives artist-users the opportunity to open a gateway to their preferred listeners. This is possible when listeners are listening to songs 21 that match the characteristics of the songs 25 that the artist has uploaded. Moreover, if the characteristics between the songs are similar, the artists' songs 25 are presented to the listener-users. The listeners are then prompted to listen to and buy the songs 25, merchandise and concert tickets of the artist.

Another feature of the present invention to artist-users is an even playing-ground. This means that embodiments 100 of the invention provide a platform for all artist-users that does not value or weight the well-known artist-users more than the "unknown" (or lesser known) ones. Likewise, the artist songs 25 that are presented to the listener user are not just the best-known in the genre, but the ones that match the particular listener user's musical (audio) taste as represented or inferred by the songs they are listening to the closest, at the moment, or relatively frequently.

Yet another capability of the method/system 100 for artist-users is the opportunity to get money and frame. This is done when listener-users buy their songs, merchandise and tickets.

Yet another attribute of the instant invention for artist-users is the level of control of the number of times the listener-user gets to listen to their song 25 as streamed in FIGS. 7 and 8 before he has to buy a copy. This allows for more flexibility for the artist to make his own personal decision of how many times he thinks a listener-user would have to (or should be allowed to) listen to a song 25 before he would choose to buy it.

Finally, the method/system 100 ensures music artist-users protection and copy rights for the music that they upload. Several emerging artists are afraid that if they promote their songs on a computer network platform, it may be stolen (easily copied). This dissuades them from popularizing their music. Embodiments of this invention provide increased protection against undesired copying.

The described invention is presented as a preferred embodiment, but it is not limited to the disclosed embodiments. Variations to the above described features and elements are suitable. On the other hand, this invention has the potential to be modified within the spirit and scope of the appended claims. The following claims are to be viewed in the widest interpretation in order to include all such modifications and corresponding structures and functions.

While this invention has been particularly shown and described with references to example embodiments thereof, it will be understood by those skilled in the art that various changes in form and details may be made therein without departing from the scope of the invention encompassed by the appended claims.

For example, it is understood that various configurations and implementations of Client 14, audio-analysis/tools 300, website 200, comparator/mobile device interface 170 and the above-described features and operations of systems 100 are suitable.

Audio analysis 300 could be performed upon upload of a song 12, 15 to cloud storage 17, on listener-user access from cloud storage 17, at time of comparing by mobile device interface 170, and/or other times. Likewise the results of audio analysis 300 (i.e., the determined characteristics 30) may be obtained by the system 100, 170 "on the fly"/on demand and not necessarily stored online.

Various 'best match' algorithms and similar matching techniques may be employed given the determined characteristics 30 of artist songs 150 and listener songs 120.

What is claimed is:

1. A computer based media access system comprising:
   a cloud computing storage member configured to store uploaded artist songs on behalf of respective artist users and store uploaded listener songs on behalf of respective listeners users; and
   at least one central processor configured to:
   automatically derive characteristics of the artist and listener songs in response to upload of the artist songs and listener songs, respectively, to the cloud computing storage member, the automatically derived characteristics include at least one characteristic selected from the group comprising beat rate, vocal pitch, tempo, and rhythm;
   store indications of the automatically derived characteristics in the cloud computing storage member;
   enable listener users using respective client devices to access respective listener songs held by the cloud computing storage member,
   in response to a listener user request for a certain listener song, stream the certain listener song to the client device of the listener user and compare indications of the automatically derived characteristics of the certain listener song to indications of the automatically derived characteristics of artist songs held in the cloud computing storage member, and
   upon the comparison results in a match between the certain listener song and one or more artist songs, recommend to the listener user through the respective client device at least one of the one or more matching artist songs for streaming and playback.

2. A system as claimed in claim 1 wherein in automatically deriving the characteristics, the at least one central processor is configured to assign values to the characteristics.

3. A system as claimed in claim 2 wherein at least one value assigned to at least one characteristic is indicative of a range of values.

4. A system as claimed in claim 1 further comprising a website configured to provide to listener users and artist users access to the storage member, and wherein a web server associated with the website automatically derives characteristics of each artist song and listener song upon upload of the song to the storage member.

5. A system as claimed in claim 1 wherein recommending to the listener user through the respective client device includes causing the client device to display indications of matching artist songs during streaming of the certain listener user song to the client device.

6. A system as claimed in claim 1 further comprising the client device, the client device is configured to enable the listener user to select and play at least one of the matched artists songs on the client device, and wherein the at least one central processor is further configured to stream the at least one matched artist song to the client device upon selection by the listener user.

7. A system as claimed in claim 6 wherein the at least one central processor is further configured to enable the listener user to access additional goods by the respective artist user of the at least one matched artist song.

8. A system as claimed in claim 6 wherein the at least one central processor is further configured to enable the listener user to purchase a copy of the at least one matched artist song.

9. A system as claimed in claim 6 wherein the client device is any of a mobile phone, smart phone, personal data assistant, portable computer, portable media player, or combination thereof.

10. A system as claimed in claim 6 wherein the client device is configured to free respective local memory of streamed songs and thus relieves local memory space on the client device.

11. A computer based media access method comprising:
using cloud computing storage, to store uploaded artist songs on behalf of respective artist users and uploaded listener songs on behalf of respective listener users;
automatically derive, by at least one central processor, characteristics of the artist and listener songs in response to upload of artist songs and listener songs, respectively, to the cloud computing storage member, the automatically derived characteristics include at least one characteristic selected from the group comprising beat rate, vocal pitch, tempo, and rhythm;
storing indications of the automatically derived characteristics in the cloud computing storage;
enabling a listener user using a client device to access respective listener songs held by the cloud computing storage;
in response to a request by the listener user for a certain listener song, streaming the certain listener song to the client device of the listener user and comparing indications of the automatically derived characteristics of the certain listener song to indications of automatically derived characteristics of artist songs held in the cloud computing storage member; and
upon the comparison results in a match between the certain listener song and one or more artist songs recommending to the listener user through the respective client device at least one of the one or more matching artist songs for streaming and playback.

12. A method as claimed in claim 11 wherein automatically deriving the characteristics includes assigning values to the characteristics.

13. A method as claimed in claim 12 wherein at least one value assigned to at least one characteristic is indicative of a range of values.

14. A method as claimed in claim 11 further comprising providing a website configured to provide to listener users and artist users access to the cloud computing storage, and wherein a web server associated with the website automatically derives characteristics of each artist song and listener song upon upload of the song.

15. A method as claimed in claim 11 wherein recommending to the listener user through the respective client device at least one of the one or more matching artist songs includes causing display through the client device of indications of matching artists songs during streaming of the certain listener user song to the client device.

16. A method as claimed in claim 11 further comprising:
enabling the listener user to select and play the recommended at least one of the matched artist songs on the device; and
streaming the recommended at least one matched artist song to the client device.

17. A method as claimed in claim 16 wherein enabling the listener user to select and play the recommended at least one of the matched artist songs includes enabling the listener user to access additional goods by the respective artist user of the recommended at least one matched artist song.

18. A method as claimed in claim 16 further comprising enabling the listener user to purchase a copy of the at least one matched artist songs.

19. A method as claimed in claim 16 wherein enabling the listener user to play the recommended at least one matched artist song includes limiting a number of times the listener user is allowed to play the recommended at least one matched artist song before purchase of the song, said limited number being definable by respective artist user of the at least on matched artist song.

20. A method as claimed in claim 11 wherein the client device is any of a mobile phone, smart phone, personal data assistant, portable computer, portable media player, or combination thereof.

21. A method as claimed in claim 11 wherein using the cloud computing storage is in a manner enabling the client device to be free of storing songs locally and thus relieves memory space on the client device.

\* \* \* \* \*